(12) United States Patent
Herzi

(10) Patent No.: US 6,615,288 B1
(45) Date of Patent: Sep. 2, 2003

(54) GENERATING SYSTEM MANAGEMENT INTERRUPT IN RESPONSE TO USB CONTROLLER SIGNAL AND PROCESSING INTERRUPT ROUTINE IN UPPER MOST LEVEL OF SYSTEM MEMORY

(75) Inventor: Dirie N. Herzi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/472,863

(22) Filed: Dec. 27, 1999

(51) Int. Cl.[7] .............................................. G06F 13/00
(52) U.S. Cl. .............................. 710/10; 710/8; 710/17; 710/48; 710/63; 710/260; 710/266; 710/269; 713/1; 713/2
(58) Field of Search ................................ 710/8, 10, 17, 710/48, 63, 260, 266, 269; 713/1, 2

(56) References Cited

U.S. PATENT DOCUMENTS

| | | | |
|---|---|---|---|
| 5,339,437 A | | 8/1994 | Yuen ........................... 710/261 |
| 5,357,628 A | | 10/1994 | Yuen ........................... 714/34 |
| 5,511,204 A | * | 4/1996 | Crump et al. ................ 713/330 |
| 5,586,301 A | * | 12/1996 | Fisherman et al. .......... 711/152 |
| 5,628,027 A | | 5/1997 | Belmont ........................ 710/1 |
| 5,694,582 A | | 12/1997 | Pearce ......................... 710/305 |
| 5,734,844 A | * | 3/1998 | Moughanni et al. ......... 710/107 |
| 5,764,999 A | | 6/1998 | Wilcox et al. ................ 710/261 |
| 5,836,013 A | | 11/1998 | Greene et al. .................. 713/2 |
| 5,872,995 A | * | 2/1999 | Chaiken ........................ 710/5 |
| 5,896,534 A | * | 4/1999 | Pearce et al. .................. 710/17 |
| 5,943,506 A | * | 8/1999 | Poisner ......................... 710/48 |
| 5,963,738 A | | 10/1999 | Yamaki et al. ............... 713/100 |
| 5,978,903 A | * | 11/1999 | Quimby et al. .............. 712/229 |
| 5,983,356 A | * | 11/1999 | Pandey et al. ............... 713/322 |
| 6,067,589 A | * | 5/2000 | Manata ......................... 710/63 |
| 6,128,732 A | * | 10/2000 | Chaiken ........................ 713/2 |
| 6,366,877 B1 | * | 4/2002 | Nishino et al. ............... 703/25 |

FOREIGN PATENT DOCUMENTS

| | | |
|---|---|---|
| JP | 9062607 A | 3/1997 |
| WO | WO 98/00783 | 1/1998 |

OTHER PUBLICATIONS

U.S. Pending patent application by Jue, et al.; Dell USA L.P. (DC–01979), Filed Sep. 3, 1999.
U.S. Pending patent application Ser. No. 09/234,435 entitled "Method and System for Executing Bios Code in Secure Multitasking Operation Environment" by Marc Alexander; Dell USA, L.P., Filed Jan. 20, 1999.
U.S. Pending patent application Ser. No. 09/275,826 entitled "System and Method for Handling Interrupts in a Multi–Processor Computer" by Tyner, et al.; Dell USA, L.P., Filed Mar. 25, 1999.

* cited by examiner

*Primary Examiner*—Jeffrey Gaffin
*Assistant Examiner*—Tammara Peyton
(74) *Attorney, Agent, or Firm*—Baker Botts L.L.P.

(57) ABSTRACT

Systems and methods for enabling computer system devices and components are disclosed. A method for use in a computer system having a processor includes receiving an input from a device coupled to the system and generating an interrupt signal in response to the input. The method further includes placing the system in a management mode in response to the interrupt and processing an interrupt routine associated with the interrupt. The method further includes processing the interrupt routine located in an upper level of the system's available memory and providing information to a driver associated with the system.

29 Claims, 3 Drawing Sheets

GENERATING SYSTEM MANAGEMENT INTERRUPT IN RESPONSE TO USB CONTROLLER SIGNAL AND PROCESSING INTERRUPT ROUTINE IN UPPER MOST LEVEL OF SYSTEM MEMORY

TECHNICAL FIELD

The present disclosure generally relates to configuring computer systems and, more particularly, to systems and methods for enabling computer systems' devices and components.

BACKGROUND

Technological advancements for increasing the number of devices for computer systems and servers have taken on many forms. Several types of devices have become available for computer systems allowing users to expand a system's functionality and configuration. For example, conventional systems can include expansion slots or bays connected to the system's mother board for connecting additional devices.

Two of the most common interfaces for connecting peripheral devices include Peripheral Component Interconnect (PCI) interface systems and small computer system interface (SCSI) systems. PCI and SCSI interfaces allow users to add additional devices such as hard drives, tape drives, CD-ROM drives, scanners, etc. relatively easy without users having to open the system's housing.

Rivaling PCI and SCSI interface systems is the Universal Serial Bus (USB). USB is an external bus standard that supports data transfer rates of 12 Mbps (12 million bits per second). A single USB port can be used to connect up to 127 peripheral devices, such as mice, modems, and keyboards. USB supports Plug-and-Play (PnP)and "hot-plug" installation of devices.

With a data at the rate of 12 Mbps and the availability of PCI-USB add-in cards, USB is expected to completely replace serial parallel ports. A single independent USB bus can support multiple medium to low-speed peripherals such as telephones, digital cameras, modems, keyboards, mice, digital joysticks, some CD-ROM drives, tape and floppy drives, digital scanners and specialty printers. USB's data rate also accommodates a whole new generation of peripherals, including Movie Picture Experts Group (MPEG) video-base products, data gloves and digitizers. Additionally, USB can provide an interface for Integrated Services Digital Network (ISDN) and digital Public Branch Exchanges (PBXs).

Problems can occur when interfacing USB devices with a computer system's basic input output system (BIOS) and operating system (OS). For example FIG. 1 is illustrative of one technical disadvantage of using additional hardware to provide a device interface. FIG. 1 illustrates a common driver interface configuration used to interface a USB keyboard and mouse to an OS via a device driver. The USB controller receives an input from the keyboard or mouse and provides an input to a controller interface. The controller interface utilizes a keyboard controller, typically an 8042 controller, to generate a system interrupt. Upon generating a system interrupt the input data for the device can be passed to the driver via an I/O register in the 8042. Thus, the 8042 controller plays an integral part in providing real time data from the device to the device's driver.

A technical disadvantage with the configuration illustrated in FIG. 1 is that the USB devices can be unavailable during system initialization, system set-up, and safe mode. Typically, the mouse driver interface relies on the system's BIOS to provide input data for the device in real time. The BIOS places a far call routine to the driver and passes the input data to the device's driver via the stack. During initialization, the associated hardware and software routines for the device must be loaded in the system's available memory in order for the device to be enabled.

A constraint is placed on the conventional configuration due to the limited amount of memory available during initialization. The BIOS only has a limited amount of available memory thereby limiting the number of BIOS initializable devices. For instance, a keyboard is needed during safe mode operation of the system for input to the safe mode menu. If the system BIOS fails to initialize and configure the keyboard and associated software routines the keyboard is useless. The user then would be unable to provide input to the system. Thus, as new BIOS controlled USB devices are added to the system, the availability of real time data transferability by the BIOS becomes limited.

SUMMARY

In accordance with the teachings of the present disclosure, systems and methods are described for enabling computer system devices and components. The conceptual groundwork for the present disclosure involves configuring computer systems having USB devices and controllers.

According to one aspect of the present embodiment a method for use in a computer system having a processor is disclosed. The method includes receiving an input from a device coupled to the system, generating an interrupt signal in response to the input and placing the system in a management mode in response to the interrupt. An interrupt routine associated with the interrupt is provided, the interrupt routine being located in an upper level of the system's available memory. The method also includes providing information to a driver associated with the system.

More specifically, one embodiment of the method includes receiving the interrupt and providing a system management interrupt.

Another embodiment of the method includes providing an input to a system management interrupt handler and processing the interrupt routine in response to the input.

A further embodiment of the method includes initializing the controller and device during a BIOS power on self test routine, wherein the initializing includes configuring the system to communicate information between the input device and the driver.

According to another aspect of one embodiment a method of initializing a computer system having a controller and device is disclosed. The method includes initializing the controller and device, wherein the controller is associated with the device. The method further includes configuring the controller to generate an interrupt in response to an input from the device and configuring a chipset coupled to the system. The step of configuring includes associating the interrupt to an interrupt request line coupled to the system, and attributing the interrupt request line to a system management interrupt.

In another aspect of one embodiment, a computer system is disclosed. The computer system includes at least one processor, at least one storage medium coupled to the processor, a controller coupled to the system, and a program of instructions stored within the storage medium. The program includes at least one instruction configured to receive an input from a device and at least one instruction configured to provide a system management interrupt in response to the input. The system management interrupt places the processor in a system management mode. The method also includes at least one instruction to provide information to a driver associated with the system.

In a further aspect of one embodiment, a method for providing a service routine in a computer system is disclosed. The method includes providing a controller configured to generate a system management interrupt, receiving an input to the controller from a device coupled to the system, and generating the system management interrupt in response to the input. The system management interrupt is associated with providing information to a system driver and the information is responsive to the input.

In another aspect of one embodiment, a method of providing information to a driver in a computer system is disclosed. The method includes providing a universal serial bus (USB) device and USB controller operably coupled to the USB device. The method includes configuring the USB controller to receive an input from the USB device and generate an interrupt signal responsive to the input. The method includes generating a system management interrupt in response to the USB controller's interrupt signal, placing the system in a system management mode in response to the system management interrupt, and processing an interrupt routine located in an upper level of a memory device operably coupled to the system. The method further includes providing information to a system driver wherein the information is associated with the interrupt routine and the input from the USB device.

It is a technical advantage that a system can be configured using existing hardware and software to generate system interrupts for universal serial bus devices.

It is another technical advantage that using the top of memory for data and code affords expandability to a system incorporating the present disclosure.

It is a further technical advantage that information or data from a USB device can be provided to a system's driver in real time obviating the need for using additional hardware that requires polling.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
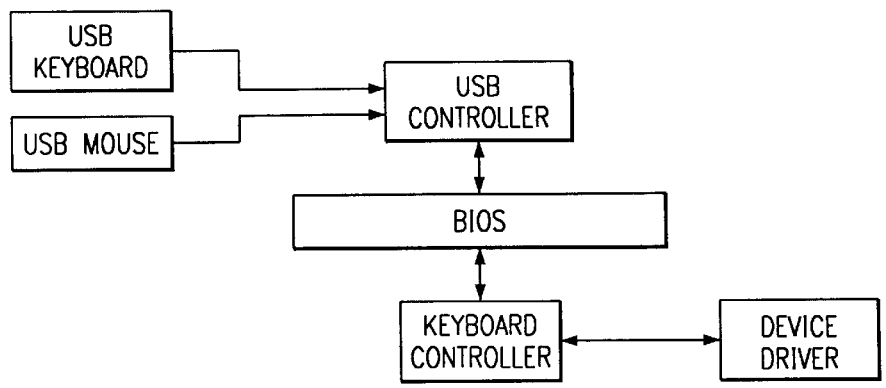
FIG. 1 is an illustration of a commonly used peripheral device configuration for computer systems.

The present disclosure relates to computer systems and configuring system devices and components. The following terminology and acronym descriptions are provided to describe terminology and acronyms used within the description and are not disclosed in a limiting sense, but for clarity.

An interrupt, as discussed herein, is a signal from a device attached to a computer providing a hardware interrupt or from a program within the computer providing a software interrupt. The signal informs the operating system (OS) that an event has occurred. Upon sensing an interrupt, the OS typically takes some action as specified by the interrupt handler.

A driver is a program that interacts with a particular device such as a USB device, or special kind of software routine or program. The driver includes special knowledge of the device and/or a special software interface that programs using the driver do not. However, some operating systems load drivers that rely on the system BIOS to deliver data without having unique knowledge of the device. One example is a hard disk driver that is loaded during the operating system (OS) boot up. The OS will initiate an interrupt that calls the system BIOS to read data from the hard disk drive. Therefore, the OS does not know which interface (i.e. USB, PCI, IDE, etc.) is coupled to the hard disk drive. However, the OS is cognizant of the file system and other relevant information associated with the hard disk drive and needed during the OS boot.

System Management Mode "SMM" is a central processing unit (CPU) operating mode that is independent of the system's OS and application programs. In general, SMM is configured to be used by the system BIOS. When a CPU enters SMM, the CPU saves its current state in a particular portion of random access memory (RAM) called SMRAM (System Management RAM). The CPU further runs a program, also-stored in SMRAM, called the SMM handler.

A system management interrupt (SMI) interrupts program execution by placing the system in SMM. The processor services the SMI by asserting an SMI active signal while in SMM, indicating to the system that the system should enable SMRAM. The processor jumps to a memory address in SMRAM to execute the SMI handler, a routine that performs the system management activities requested during SMM. In a preferred embodiment of the invention, portions of the SMI handler are located in the upper most physical memory locations of the system that are typically reserved for use by the system's OS.

In an advantageous embodiment of the disclosure a computer system is provided having at least one universal serial bus (USB) device and a USB controller associated with the USB device for generating interrupts to the system's microprocessor. Preferably, a USB controller is configured by the system BIOS. The USB controller is initialized during the power-on-self-test (POST) routine deployed by the system's BIOS when the system power is turned on or the system is re-initialization. During POST, the USB controller is configured to generate an interrupt signal and the system's chipset is configured to route the USB controller interrupt to an interrupt request line (IRQ). Accordingly, the system's interrupt vector table is updated reflecting the location of the interrupt service routine.

During run-time, an interrupt service routine (ISR) receives an input from a USB device coupled to the USB controller. The system's interrupt handler generates a system management interrupt (SMI) in response to the detected interrupt from the USB device and places the system in system management mode (SMM). The ISR then receives input data or information from the USB device in real-time during SMM from the SMI handler. Upon processing the input data, the ISR receives data responsive to the USB device input and, upon validation, returns the data to a system driver via the stack. In this manner, a USB device can be coupled to the system, initialized, and used without having to provide additional hardware such as an 8042 keyboard controller to generate interrupt request signals to the processor thereby providing a system with real-time data accessibility for USB devices and system drivers.

Figure 2:
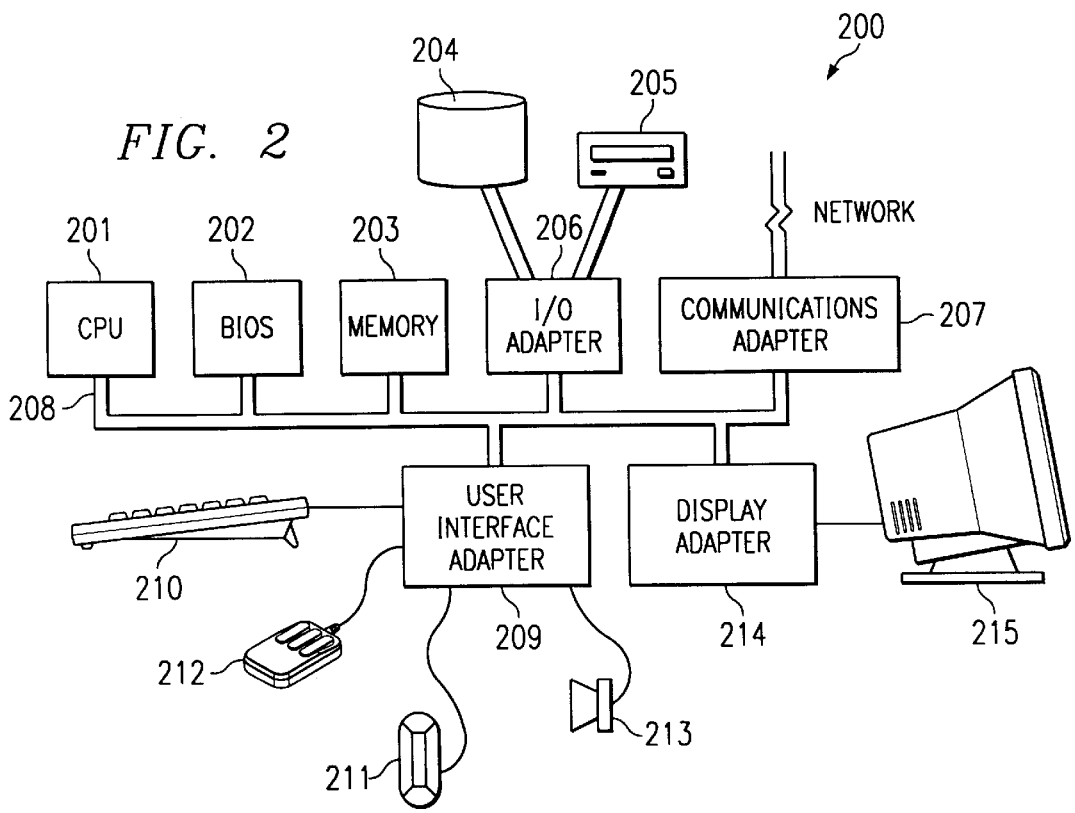
FIG. 2 is a block diagram of a computer system illustrative of one embodiment of the present disclosure.

Referring now to FIG. 2, a block diagram of a computer system illustrative of one embodiment of the present disclosure is shown. A system, indicated generally at 200, includes a central processing unit (CPU) 201 connected via at least one bus 208 to a basic input output system (BIOS) firmware 202, and memory, such as RAM, ROM, EEPROM, and any other memory devices, collectively designated by reference numeral 203. System 200 further includes an input/output adapter 206 for connecting any combination of peripheral devices such as a USB hard drive 204, RAID drives 205, digital scanners (not shown), specialty printers (not shown), or other devices capable of being coupled to input/output adapter 206. Bus 208 is also coupled to a display adapter 214 for connecting a display device 215 such as a Flat Panel Display (FPD) or a Cathode Ray Tube (CRT).

A user interface adapter 209 is provided for connecting a keyboard 210, a mouse 212, a speaker 213, a microphone 211, and/or other user interface devices such as game controllers, touch pads, etc. System 200 also includes a communications adapter 207 for connecting system 200 to an information network such as an Intranet or the Internet. In a preferred embodiment, a combination of input/output adapter 206, interface adapter 209, and communications adapter 209 may be configured to communicate with a universal serial bus (USB) thereby allowing USB devices to be coupled to system 200.

BIOS firmware 202 includes a built-in software program, referenced generally as BIOS, accessible to system 200. The BIOS includes instructions for controlling the system 200's devices and testing memory. During operation, system 200 is initially powered up and CPU 201 activates the BIOS. The BIOS runs a series of tests including a power on self test (POST) routine that initializes the system 200's hardware, chip registers, disk drives, power management, I/O ports, peripheral devices, and any other device or component requiring initialization by a POST routine.

System 200 includes a program of instructions stored within a storage medium. The program is configured to receive an input from a device, provide a system management interrupt in response to the input wherein the system management interrupt places the processor in a system management mode. The program further provides information to a driver associated with the system.

Figure 3:
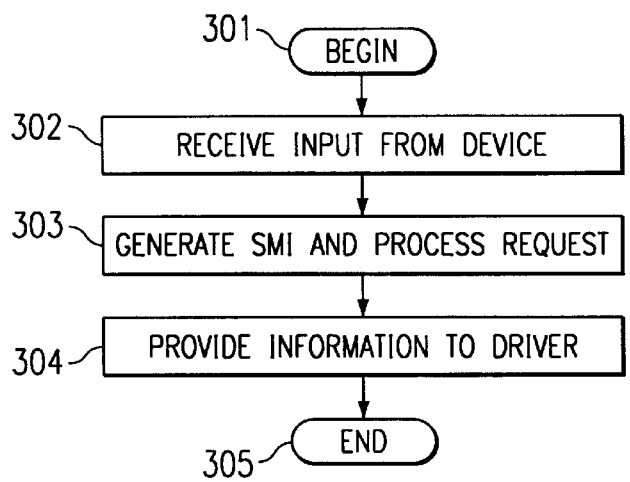
FIG. 3, is a flow diagram of one embodiment of a method for enabling universal serial bus devices operably associated with a computer system.

Referring now to FIG. 3, a flow diagram of one embodiment of a method for enabling universal serial bus devices operably associated with a computer system is shown. The method can be configured to be used with system 200 as illustrated in FIG. 2 or other system capable of implementing the method of FIG. 3.

During operation of system 200 the method begins at step 301. At step 301, an input is received by a USB device. The input could be from a USB device, such as a mouse or a modem, operably coupled to system 200. Upon the USB controller receiving the input, the method proceeds to step 302 where the USB controller provides an interrupt signal to processor 201. The interrupt is detected by processor 201 through an interrupt handler associated with processor 201. At step 303, processor 201 generates a system management interrupt (SMI) responsive to the interrupt provided by the USB Controller. The SMI places the processor in a system management mode (SMM) allowing the input device to provide information to a system driver in real-time at step 304. The method then proceeds to step 305 where the method ends. In this manner, a USB device operably coupled to system 200 can provide real-time input to the driver without using additional hardware-or memory resources.

Figure 4:
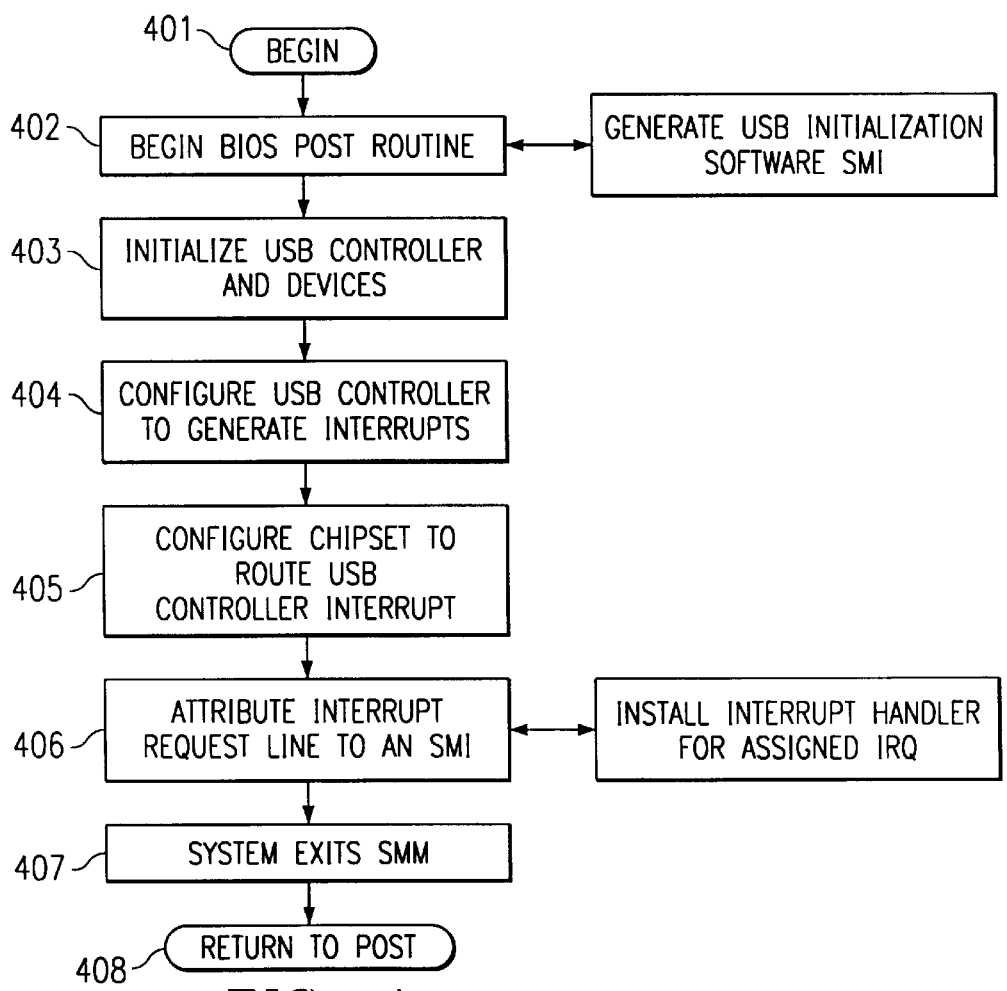
FIG. 4 is a flow diagram of one embodiment of a method for providing an initialization routine for enabling a USB device according to one embodiment of the resent disclosure.

Referring now to FIG. 4, a flow diagram of one embodiment of a method for providing an initialization routine for enabling a USB device according to one embodiment of the resent disclosure is shown. The method can be implemented using system 200 as illustrated in FIG. 2 or another system capable of implementing the method of FIG. 4.

During operation, the initialization routine begins at step 401. At step 402 the BIOS deploys a POST routine for testing and initializing devices coupled to system 200. As previously mentioned, the POST routine initializes and tests the system's hardware and associated devices. At step 402, the POST routine generates a USB initialization software system management interrupt (SMI). The SMI is received by processor 201 and places the processor in system management mode (SMM). In a preferred embodiment, an SMI handler deploys a software routine for the USB device in an upper level of available memory of system 200. For example, if 128 MB of memory was available to system 200 while in SMM, the software routine would occupy the upper block of the $128^{th}$ MB of memory. Therefore, in this example the starting location of the routine would by located at a memory location of 128 MB less the size of the routine in bytes.

Upon executing the USB initialization software, the method proceeds to step 403 where the USB controller and associated devices are initialized. The method then proceeds to step 404 where the USB controller is configured to generate interrupts. For example, an interrupt for a USB keyboard is created when a user depresses a key on the keyboard. The keyboard provides an input to the USB controller that initiates an SMI for processor 201. By configuring the USB controller to generate an SMI, the USB device can provide real-time access to a driver. Advantageously, additional hardware such as an 8042 controller is not required to provide interrupt signals to processor 201.

The method then proceeds to step 406 where the chipset for system 200 is configured to route the USB controller interrupts to an IRQ. For example, the USB controller has several local interrupts that can be assigned to USB devices coupled to the USB controller. Therefore, the USB controller interrupts are mapped to a system level IRQ thereby enabling the USB device to create an interrupt to controller 201. In this manner, an input from a USB device can be provided to the USB controller and a corresponding IRQ signal associated wit the USB device is provided to processor 201.

Upon configuring the chipset, the method proceeds to step 406 wherein the interrupt handler for system 200 assigns a value for the USB device's IRQ. In a preferred embodiment, the interrupt handler updates the system's interrupt vector table stored in the memory of system 200. The interrupt vector table includes memory addresses of the interrupt service routine (ISR). Therefore, when an interrupt is generated by a device the CPU calls the appropriate ISR by looking up the ISR in the interrupt vector table. The ISR assigned to the device generates an SMI via a software or hardware mechanism. By associating the USB device IRQ to an SMI, the USB device can place CPU 201 in an SMM mode allowing the USB device to provide information in real-time. Additionally, the vector table includes a reference to an SMI routine stored in the upper region of available memory and accessible by the interrupt handler upon an interrupt generated by the USB device.

The method then proceeds to step 407 where system 200 exits SMM and returns to the POST routine at step 408. Therefore, the method illustrated in FIG. 4 advantageously provides a method of initializing a system having a USB controller and USB devices by configuring the system to process inputs from USB devices and provide information or data to a driver associated with the USB device in a real-time mode of system operation.

Figure 5:
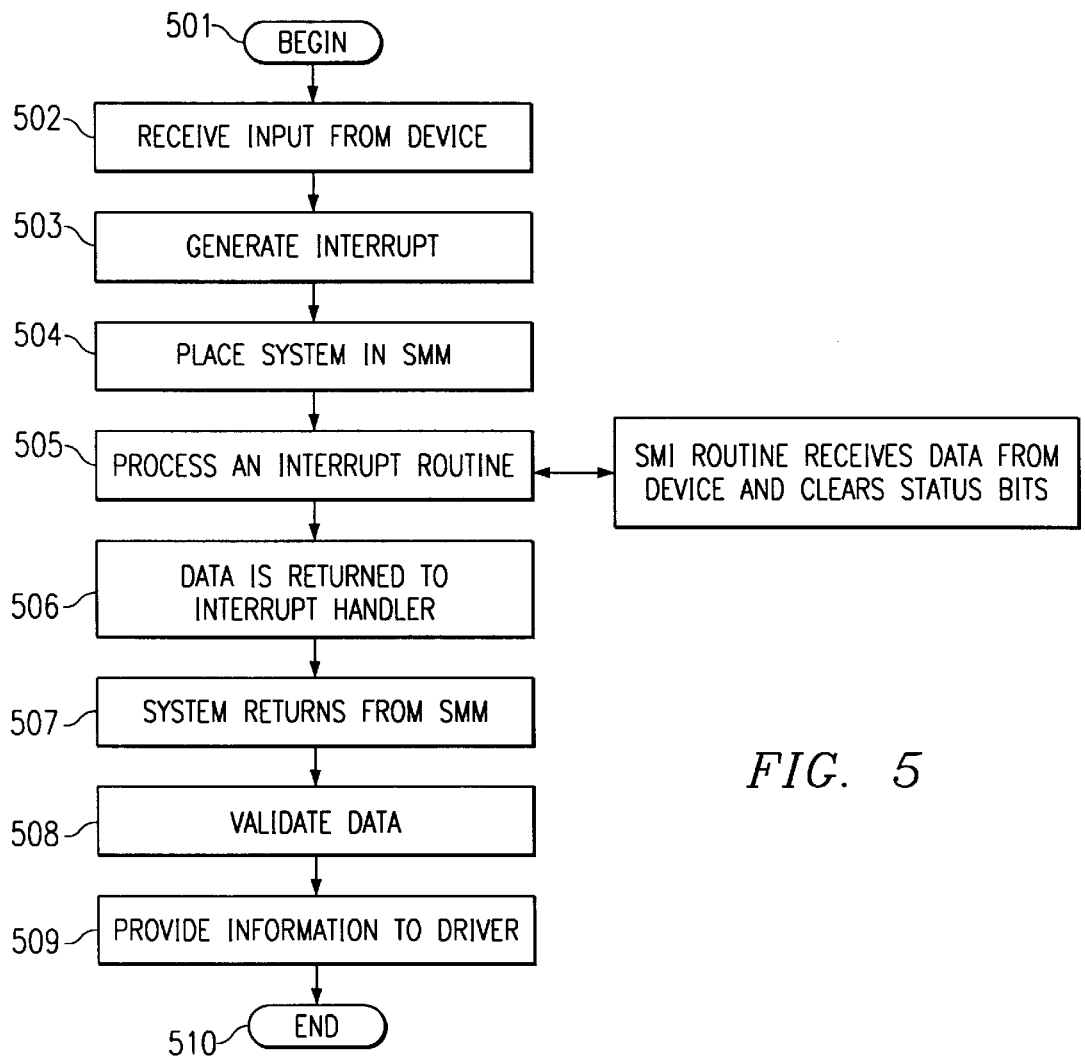
FIG. 5 is an flow diagram of one embodiment of a method for providing an interrupt service routine for a USB device.

Referring now to FIG. 5, a flow diagram of one embodiment of a method for providing an interrupt service routine for a USB device is shown. The method can be configured to be used with system 200 as illustrated in FIG. 2 or another system capable of implementing the method of FIG. 5.

During operation the method begins at step 501. At step 502, an interrupt is received from a USB device such as a keyboard 210, mouse 212, USB hard drive 204, or any other device configured as a USB device and operably coupled to system 200. The interrupt can be created in a plurality of ways, for example, a signal associated with a user moving mouse 212 would be provided to the USB controller. At step 503, the USB controller generates an interrupt in response to the device input. The CPU calls the interrupt handler for the generated interrupt.

The method then proceeds to step 504 where the generated SMI is received by processor 201 and the processor is placed in system management mode (SMM). By placing processor 201 in SMM, the method advantageously processes code that would otherwise have been too large to exist within the ISR.

At step 505, an SMI routine associated with the device is processed in a protected mode in the upper level of memory as described above. The SMI routine uses an SMI handler to receive input data from the device and clear the appropriate status bits. The method then proceeds to step 506 where data associated with the USB device input is returned to the interrupt handler by processor 201 or system's 200 chipset register. The method then proceeds to step 507 where the processor returns from SMM and the ISR receives data from processor 201 or system's 200 chipset register. Upon validating the data at step 508, the method proceeds to step 509 where the information is loaded onto the stack and the driver associated with the USB device accesses the information on the stack.

Therefore, through configuring the USB controller to generate an interrupt associated with an SMI, processor 201 can be placed in SMM and system 200 can process inputs from a USB device to a system driver in a real-time mode without having memory restrictions, such as 1 MB, typically associated with interrupt service routines.

Although the disclosed embodiments have been described in detail, it should be understood that various changes, substitutions and alterations can be made to the embodiments without departing from their spirit and scope.

What is claimed is:

1. A method for use in a computer system having a processor, the method comprising:

receiving an input from a device coupled to the system;

generating an interrupt signal in response to the input;

placing the system in a management mode in response to the interrupt signal;

processing an interrupt routine associated with the interrupt signal, the interrupt routine located in an upper most level of the system's available physical memory;

updating an interrupt vector table with the location of the interrupt routine; and providing information to a driver associated with the system.

2. The method of claim 1, wherein the generating includes a controller generated interrupt.

3. The method of claim 1, wherein the generating includes providing a system management interrupt in response to the interrupt signal.

4. The method of claim 1, wherein the placing includes:

receiving the interrupt signal; and providing a system management interrupt.

5. The method of claim 1, wherein the providing information includes:

providing an input to a system management interrupt handler; and processing the interrupt routine in response to the input.

6. The method of claim 1, further comprising initializing the controller and device during a BIOS power on self test routine, wherein the initializing includes configuring the system to enable communication of information between the input device and the driver.

7. The method of claim 1, wherein the controller is a USB controller.

8. The method of claim 1, wherein the device is a USB device.

9. The method of claim 1, wherein the providing information includes providing information using a memory stack association with the system.

10. A method of initializing a computer system having a controller and device comprising:

initializing the controller and device, wherein the controller is associated with the device;

configuring the controller to generate an interrupt in response to an input from the device;

configuring a chipset coupled to the system, wherein the configuring includes associating the interrupt to an interrupt request line coupled to the system;

updating an interrupt vector table with one or more memory addresses; and attributing the interrupt request line to a system management interrupt.

11. The method of claim 10, further comprising:

deploying a BIOS power on self test routine;

placing the system in a management mode;

installing an interrupt handler; and exiting the system management mode.

12. The method of claim 10, wherein the controller is configured to be a universal serial bus (USB) controller.

13. The method of claim 10, wherein the controller is a programmable controller.

14. The method of claim 10, wherein the device is configured to be a universal serial bus (USB) device.

15. The method of claim 10, further comprising updating an interrupt table stored in a memory device coupled to the system.

16. A computer system comprising:

at least one processor;

at least one storage medium coupled to the processor;

a controller coupled to the system, the controller operable to generate an interrupt signal; and a program of instructions stored within the storage medium, the program comprising:
- at least one instruction configured to receive an input from a device;
- at least one instruction configured to provide a system management interrupt in response to the input and the interrupt signal, wherein the system management interrupt places the processor in a system management mode;
- at least one instruction to provide information to an interrupt vector table,
- at least one instruction to provide information to a driver associated with the system.

17. The system of claim 16, wherein the medium is a memory device.

18. The system of claim 17, wherein the memory device includes a interrupt routine configured to be stored in an upper most level of the memory device.

19. The system of claim 16, further comprising an initialization sequence including:
- at least one instruction to configure the controller to generate an interrupt; and
- at least one instruction configured to associate an interrupt request line with the interrupt.

20. The system of claim 19, wherein the initialization is associated with a BIOS power on self test routine.

21. The system of claim 16, wherein the at least one storage medium includes a memory stack to provide the information to the driver.

22. A method for providing a service routine in a computer system, the method comprising:
- storing an interrupt routine in an upper most level of the system's available physical memory;
- updating an interrupt vector table with the location of the interrupt routine;
- providing a controller configured to generate a system management interrupt;
- receiving an input to the controller from a device coupled to the system; and
- generating the system management interrupt in response to the input, wherein the system management interrupt is associated with providing information to a system driver, the information being responsive to the input.

23. The method of claim 22, wherein the providing includes initializing the controller and device.

24. The method of claim 23, wherein the initializing includes:
- configuring the controller to provide an interrupt associated with a system interrupt request line;
- associating the interrupt request line to the system management interrupt;
- providing the interrupt routine located in an upper level of memory operably coupled to the system; and
- wherein the system management interrupt is associated with the interrupt routine.

25. The method of claim 22, wherein the generating includes:
- providing an interrupt signal to an interrupt request line coupled to the system;
- detecting the interrupt signal using an interrupt handler;
- placing the system in a system management mode in response to the system management interrupt; and
- processing a routine associated with the system management interrupt, wherein the routine is located in an upper memory location of the system.

26. The method of claim 22, further comprising verifying the information.

27. The method of claim 22, wherein the controller is configured to be a universal serial bus controller.

28. The method of claim 22, wherein the device is configured to be a universal serial bus device.

29. A method of providing information to a driver in a computer system, the method comprising:
- providing a universal serial bus (USB) device and USB controller operably coupled to the USB device;
- configuring the USB controller to receive an input from the USB device and generate an interrupt signal responsive to the input;
- generating a system management interrupt in response to the USB controller's interrupt signal;
- placing the system in a system management mode in response to the system management interrupt;
- updating an interrupt vector table with one or more memory addresses for an interrupt routine;
- processing the interrupt routine located in an upper most level of a memory device operably coupled to the system; and
- providing information to a system driver, wherein the information is associated with the interrupt routine and the input from the USB device.

* * * * *